United States Patent

[11] 3,598,007

| [72] | Inventors | Ronald S. Williams<br>Lexington, Ky.;<br>John J. Erhart, Cincinnati, Ohio |
|---|---|---|
| [21] | Appl No. | 713,088 |
| [22] | Filed | Mar. 14, 1968 |
| [45] | Patented | Aug. 10, 1971 |
| [73] | Assignee | The Cincinnati Shaper Co.<br>Cincinnati, Ohio |

[54] SHEARING METHOD
8 Claims, 5 Drawing Figs.

[52] U.S. Cl. .................................................. 83/36, 83/42
[51] Int. Cl. .................................................. B26d 3/00
[50] Field of Search .......................................... 83/36, 35, 39, 50, 42, 43, 71, 23; 33/1

[56] References Cited
UNITED STATES PATENTS

| 3,242,573 | 3/1966 | Noel | 33/1 |
| 3,490,147 | 1/1970 | Brichard et al. | 83/39 X |
| 3,490,320 | 1/1970 | Valembois et al. | 83/39 |
| 3,503,290 | 3/1970 | Valembois et al. | 83/23 |
| 2,788,069 | 4/1957 | Noojin, Jr. et al. | 83/50 X |
| 3,129,622 | 4/1964 | Pearce | 83/36 |

*Primary Examiner*—Frank T. Yost
*Attorney*—Melville, Strasser, Foster & Hoffman ABSTRACT: A method of shearing a stated quantity of each of a number of different sized parts from sheet stock wherein the orientation of stock feed alternates in a predetermined pattern, and wherein the parts to be produced are laid out on the stock so that the first two cuts yield a parts blank and at least one cutoff. The parts blank is then sheared into parts, and the cutoff is sheared in two cuts into a second parts blank and the sequence repeated until the starting sheet is consumed.

Patented Aug. 10, 1971

INVENTOR/S
RONALD S. WILLIAMS &
JOHN J. ERHART,

BY *Melville, Strasser, Foster and Hoffman*
ATTORNEYS

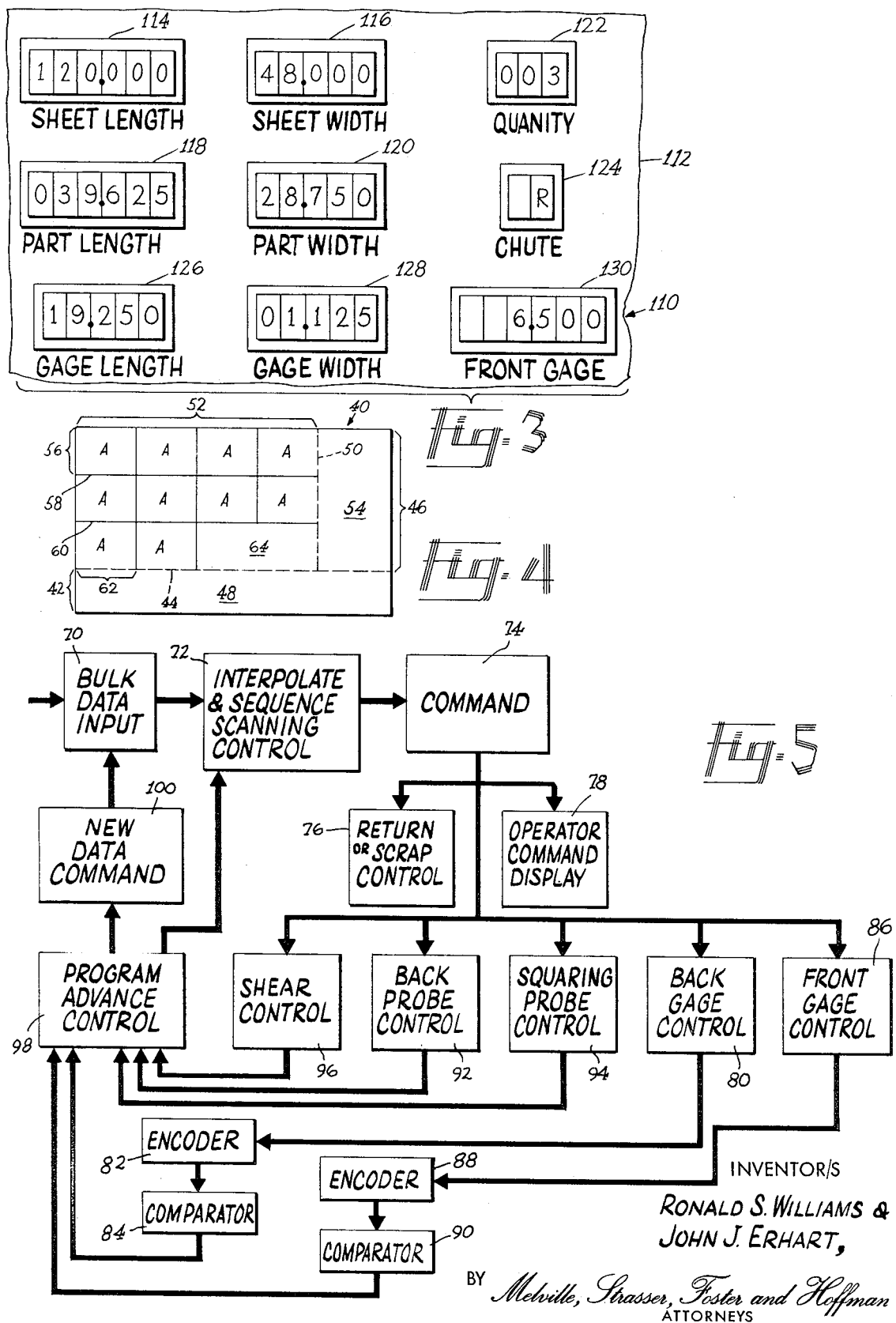

SHEARING METHOD

BACKGROUND OF THE INVENTION

This invention relates to an operation wherein number of different sized parts (each having a specific quantity requirement) are to be cut from the same gauge and type of material. According to the prior art, the operator of a shear is given a list of parts to be produced, and then he simply manually sets up the machine and begins cutting parts to meet the requirements specified. When a sufficient number of a particular part have been produced, the operator will usually have a piece or pieces of material left over. This piece or pieces must either be discarded as scrap, or retained and stored as stock for use in cutting subsequent parts. Such storage creates inventory problems, and the man hours lost in storing the odd size piece and later retrieving it reduces efficiency.

This problem is more complicated when, for example, the operator has in his possession only a list of parts to be produced that day or that week. By quickly scanning that chart, he may decide that the left over piece or pieces of stock will not be of use during the immediately foreseeable time period, and then he must balance the economics of having to store this piece or pieces for a period of time as compared with the loss realized in simply discarding it as scrap.

In addition, the operator may have sheared the large stock sheet in a method that does not produce the cutoff with the most usable dimensions. This of course amplifies the scrap storage problem.

Accordingly, it is widely recognized in industry that a shearing operation of this type involves a rather substantial scrap percentage. In addition, and as compared with other industrial processes, the volume output is generally low because of the setup time required during operation.

The instant invention has for its primary object the development of a shearing method which will minimize the scrap percentage for the operation during any given period of time.

A further object of the invention is the provision of a shearing method which will permit automatic setting of the gauges in order to minimize set up time and increase production.

Another object of the invention is to develop a method and apparatus which effectively make logic decisions for the operator, thereby cutting down on labor requirements and increasing accuracy.

A further object of the invention is the development of a shearing method which will minimize the task of operator training and education, and will, by its simplicity of operation, minimize operator error.

Another object of this invention is to provide a piece of equipment that will utilize the method of this invention.

More specifically, an object of this invention is to provide a shear having components controlled according to the method of this invention.

A specific object of this invention is to provide a shear having means for indicating to an operator the orientation of stock feed for the next cut.

SUMMARY OF THE INVENTION

The method of this invention, considered as a whole, includes two major aspects. First is the development of a repetitive series of operations. The second is a novel arrangement of the parts to be cut on the starting stock.

According to this invention, the orientation of feed of material alternates in a repetitive sequence. Two perpendicular cuts are made on the sheet of starting material to produce a parts blank and at least one cutoff. The parts blank is then sheared into parts, and the cutoff (or cutoffs) are sheared in two perpendicular cuts into an additional parts blank, and the sequence repeated until the original sheet is entirely used up.

To determine the arrangement of the different sized parts on the starting sheet stock, all of the parts to be produced in a given time period are arranged in continuous order of size, from the largest down to the smallest. The first parts blank produced in accordance with the above sequence will be sized to produce as many as possible of the largest part to be produced, while the parts blank produced from the cutoffs will be sized to achieve the optimum utilization thereof from the parts remaining on the list.

The shear used to practice the method of this invention is in part conventional. It must include gauges for determining the amount of cutoff which can be rapidly and accurately set for each cut, and an automatically controlled means for returning certain cutoffs to the operator for further processing.

In addition, this invention contemplates the provision of a control structure for the shear to indicate to an operator the orientation of stock feed for each cut. In other words, the method and apparatus of this invention are sequenced and coordinated with the operator.

DESCRIPTION OF THE DRAWINGS

FIG. 3 is an illustration of the control panel for the shear.

FIG. 4 is a diagrammatic illustration of a sheet of stock illustrating the sequence of cuts according to this invention.

FIG. 5 is a schematic diagram showing an electronic data input and control system for carrying out this invention.

DESCRIPTION OF THE PREFERRED EMBODIMENT

Figure 1:
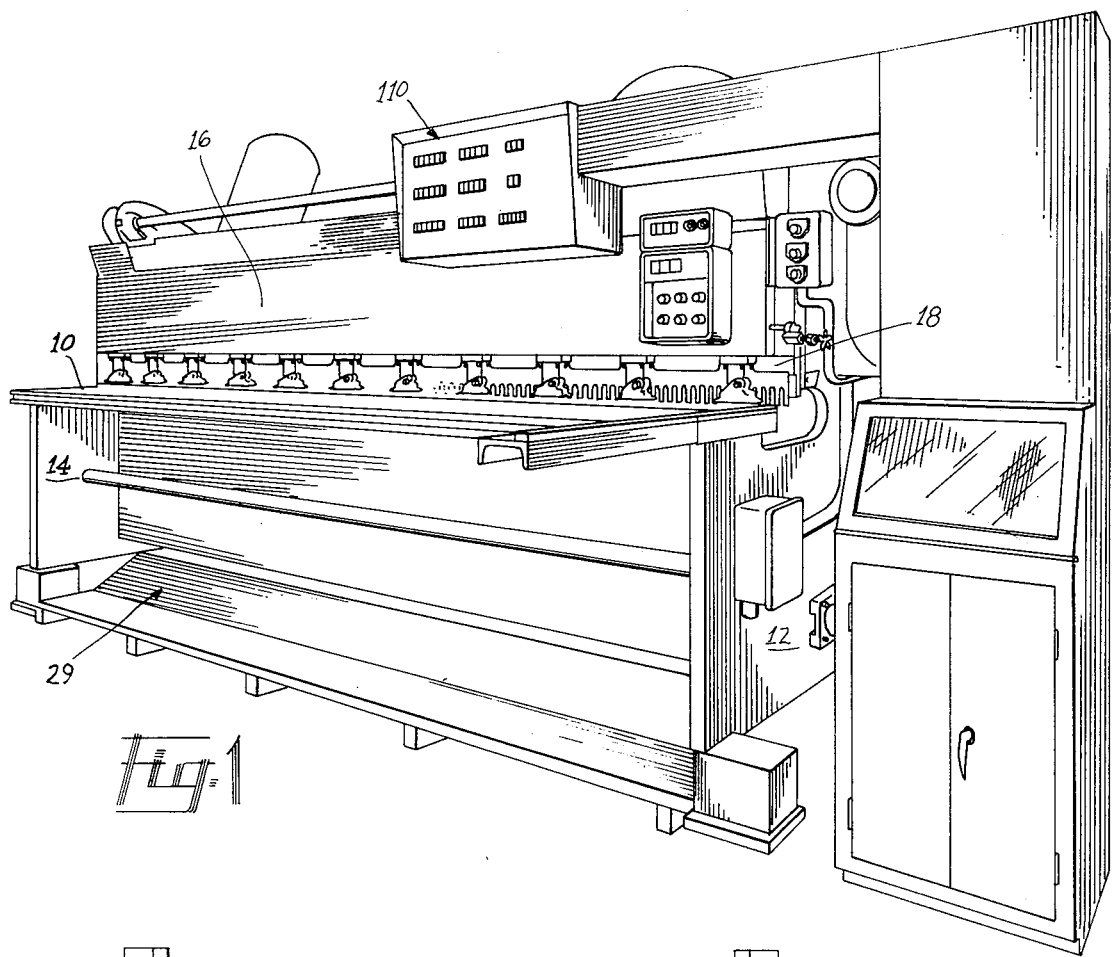
FIG. 1 is a perspective view of a shear according to this invention.
Figure 2:
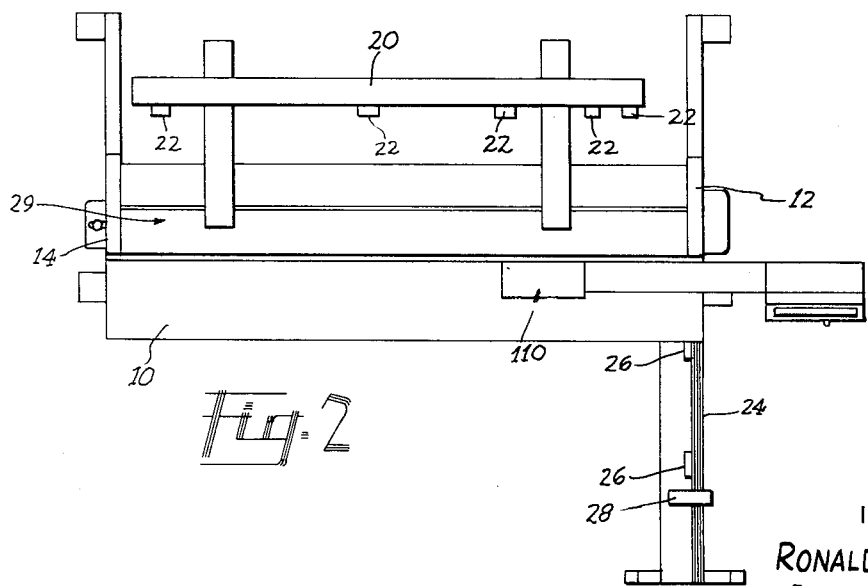
FIG. 2 is a top plan view of a shear according to this invention.

FIGS. 1 and 2 respectively show in perspective and in top plan view a shear which may be used to practice the method of this invention. The shear has the horizontal table 10, and the side plates 12 and 14. Vertically reciprocable between the side plates 12 and 14 is the ram 16 which carries the knife 18. As is well known in the art, the ram 16 and knife 18 can be reciprocated vertically by hydraulic cylinders or by a mechanical drive. These elements of the shear do not per se form a part of this invention, and hence will not be described in detail.

Referring now to FIG. 2, it will be seen that the shear is shown equipped with a back gauge 20. As is well known in the art, the back gauge is maintained parallel to the knife, and is movable toward and away therefrom to provide an adjustable stop against which the stock being sheared is placed. The back gauge may be provided with the probes 22 which insure that the stock being sheared is in proper contact with the back gauge prior to the shearing step.

The shear is also provided with the squaring arm 24 having the probes 26 for insuring squareness of material. The squaring arm may also be provided with a front gauge 28 which serves as a stop when the cutoff length exceeds the limits of the back gauge settings.

A flip-flop scrap return chute is indicated generally at 29. In one position, this chute will return a piece to the operator for reshearing; in its other position, it will discharge a cutoff as scrap.

As indicated earlier, one important aspect of the method of this invention is the development of a repetitive sequence of shearing operations. For convenience in discussing these operations, the phrase "shearing by length" will be used to refer to a cut which is parallel to the long dimension of this stock, and the phrase "shearing by width" will be used to refer to a cut which is parallel to the short dimension of the material.

This invention contemplates that a sheet of starting material is sheared by length and then sheared by width to produce a first parts blank and at least one cutoff. This operation will often be designated hereinafter as the primary sizing operation.

The first parts blank produced as just described will then be sheared by length and then by width (as necessary) into a plurality of parts.

The cutoff or cutoffs produced by the primary sizing operation are then sheared by length and then by width to produce additional parts blanks. This operation will generally be referred to as the secondary sizing operation. These additional parts blanks are then sheared as necessary into parts until the entire starting sheet of stock is used up.

The second necessary aspect of the method of this invention resides in the arrangement of parts to be produced on the starting sheets. According to this invention, all of the required parts are arranged in a list so that the largest part, by area, is first, with the rest of the parts arranged in descending order by area. For present purposes, let us arbitrarily assume that 26 different parts are to be produced, designated by the letters "A" through "Z." The largest part we will assume is represented by the letter "A" and the smallest part by the letter "Z."

Generally considered, this invention contemplates that the primary sizing operation as described above will yield a parts blank to produce as many as possible of the largest uncut part to be produced, while the secondary sizing operation will produce a parts blank for a smaller uncut part so as to achieve optimum utilization of the cutoff. It is believed that the following example will facilitate an understanding of the method of this invention.

In the practice of this invention, it is possible to utilize a single starting sheet size. Taking a single sheet of material, the first step is to arrange as many of the largest part to be produced as possible on the sheet. The arrangement is diagrammatically illustrated in FIG. 4, wherein a sheet of starting material is indicated at 40. It will be observed that the upper left-hand portion of FIG. 4 is divided into 10 equal sized rectangles representing part "A," the largest part to be produced.

The first cutoff is made by setting the back gauge to the distance 42, and shearing the sheet by length along the line 44. It will be observed that this first cut produces a portion of a width 46 equal to at least one multiple of a part width, and a first cutoff indicated at 48. If this cutoff is less than a predetermined width, the flip-flop chute will reject it as scrap. Otherwise, it will be returned to the operator via the return chute for further processing as hereinafter set forth.

The portion containing the 10 "A" parts is then sheared by width along the line 50 to produce a parts blank having a length 52 equal to at least one multiple of the desired part length, and a second cutoff indicated at 54.

As already indicated, this operation of producing a first parts blank from a full sized sheet of material is referred to as the primary sizing operation. This primary sizing operation will generate two cutoffs so long as the part length and part width are not even multiples of the sheet length and width respectively.

The parts blank created by the first two shear cuts is next sheared into parts. The back gauge is set at the distance 56, and the parts blank is sheared by length along the lines 58, and 60 to produce three rows of parts. Finally, the back gauge is set at the distance 62, and the rows are sheared by width to produce the 10 required parts. In the example shown in FIG. 4 it will be observed that a third cutoff is created, indicated at 64.

A review of the procedure followed to produce this first set of parts reveals a definite repetitive operation. That is, the starting stock is first sheared by length, then by width to produce a parts blank and two cutoffs. The parts blank is then sheared by length to produce the number of rows needed, and finally by width to produce the number of parts required.

At this point in the operation, there are now three cutoffs, 48, 54, and 64. It is now necessary to find the best parts to be produced from these cutoffs. As previously indicated, this will be referred to as the secondary sizing operation.

This secondary sizing operation is substantially the same as the primary sizing operation, except that rather than use the largest part to be produced, the list of uncut parts will be checked, and considering both size and quantity of these uncut parts, a smaller part will be selected and arranged on the cutoff to effect optimum utilization thereof and minimum scrap. (The control panel described hereinafter will indicate to the operator which cutoff is to be used.) The procedure for the shearing operation of these cutoffs in the secondary sizing operation is exactly the same as that used for the primary sizing operation, that is, shear by length and shear by width to produce a parts blank; shear the parts blank by length into rows, and shear the rows by width into individual parts.

It will be apparent from the foregoing discussion that according to this method, a given sheet of stock is processed completely before using another sheet of stock.

After the first sheet has been completed, a second sheet of stock will be obtained, and another primary sizing operation will be begun. This time, the list will be checked to see of all of the largest parts to be produced were made. If they were not, as many of these parts as possible (or as necessary) would be arranged on the stock sheet, which is again sheared by length and width to produce a parts blank and two cutoffs. In the event that all of the largest parts had already been completed in the first primary sizing operation, the next largest part in the list, part "B" would be selected, and as many as possible of this part would be arranged on the starting sheet, and the sheet sheared by length and by width to produce a parts blank and two cutoffs. The parts blank is sheared by length and by width to produce the required number of parts and perhaps a third cutoff, and then the secondary sizing operation is carried out, starting with the optimum uncut part on the list.

As already indicated, the parts to be produced have been listed in order of area. Therefore, it can be assumed that in general the primary sizing operation on the first selected sheet of stock will yield cutoffs which are smaller in area than those yielded by any other primary sizing operation that will be done for this particular parts list. Therefore, the secondary sizing operation requires that smaller parts be made from these cutoffs. As the next largest parts, "B," "C," etc. are produced, the cutoffs from the primary sizing operation become in general progressively larger in area. It again follows that progressively larger parts in general can be produced in the secondary sizing operation. Thus, in its simplest aspect, the primary sizing operation according to this method requires the utilization of parts from the top of the list and progressing downward, while the secondary sizing operation generally starts near the bottom of the list and continues progressively upward. As the operation continues, the two sizing operations will converge somewhere near the center of the list.

What this means to the scrap generated is that as larger cutoffs are produced, there are larger parts available to size to them, thereby generating the least amount of scrap for the shearing of a particular parts list.

The method as described above can be practiced by the operator manually setting the gauges and return chute for each shear cut. However, the structured, repetitive nature of the process as described facilitates automatic setting of the shear components in response to suitable data processing equipment. Such equipment does not form a part of this invention per se, and need not be described in detail in this application.

FIG. 5 is a schematic diagram showing an electronic data input and control system for carrying out this invention. Bulk data information will be supplied at 70. It will of course be understood that the data information may be supplied via punched cards, punched tape, magnetic tape, or even a direct connection to the output of a suitable computer.

As will be apparent from perusing the remainder of this figure, the input information must include data for setting the position of the scrap return chute 29, for operating the operator command display to be described later, for setting the front and back guages of the shear to the proper position, for activating the probes on the squaring arm and back gauge in accordance with the size of the material being sheared, and for activating the shear control.

This input data is first interpolated and scanned in the proper sequence at 72, so that the various commands will be given in the proper order.

The information is then directed to the command center 74, which will in effect convert the input information into appropriate machine settings. For example, information from the command center 74 can be utilized to set the scrap return chute as indicated at 76. At substantially the same time, the command center 74 will send appropriate directions to the operator command display indicated at 78, to be described presently.

The command center will also via conventional circuitry energize the back gauge control 80 to move the back gauge to a predetermined position. The encoder 82 is basically an independent device for measuring the position of the back gauge, and signals from the encoder 82 and back gauge 80 are compared in the comparator 84 to double check on accuracy.

The setting of the front gauge must of course be coordinated with the operation of the back gauge. That is, for shear cuts less than a certain length, the front gauge will be inactive. However, for cuts over this predetermined distance, the back gauge will be inactive and the front gauge will control cutoff width. In this case, appropriate signals will be sent from the command center 74 to the front gauge control 86. Again, the encoder 88 will determine the position of the front gauge, and its data will be compared with the command sent to the gauge control 86 in the comparator 90.

As is well known in the art, the back gauge and squaring arm of the shear are generally provided with a plurality of probes, indicated schematically in FIG. 2 at 22 and 26 respectively. Under normal operating conditions, only two of the back gauge probes 22 will be in operation for any given shear cut, depending of course up on the dimensions of the sheet being sheared. Similarly, the probes 26 on the squaring arm 24 will be in operation only when required. Suitable input data will be provided so that the command center 74 will, via the back probe control 92 and squaring front probe control 94 activate the proper probes.

Finally, the command center 74 will set the shear control 96 so that the cut can be made after all appropriate settings have been made. It will of course be understood that the shear can be operated manually, semiautomatically, or fully automatically.

When the commands to all of the foregoing components have been fully executed, appropriate signals will be sent from each unit to the program advance control 98, which will in turn signal the new data command unit 100 and the scanning control 72 for receipt of the next block of data information.

Whether gauge and other machine settings are made automatically or manually, the stock to be sheared must still be fed manually. Therefore, in order to make this process operational from the practical standpoint, it is necessary to coordinate stock selection and orientation of feed by the operator with the method of this invention. One exemplary control structure for effecting this coordination is shown in FIG. 3. (The control structure is shown generally in FIGS. 1 and 2 at 110.)

The control structure 110 includes a panel 112 having a plurality of apertures, behind which are disposed conventional means for displaying suitable indicia. For example, the aperture 114 in FIG. 3 is designated "sheet length." Behind the aperture will be means for displaying the length of the starting material in six digits. In the example shown, the sheet length is 120.000 inches.

Similarly, the aperture 116 is designated "sheet width," and through the aperture a five-digit display is visible indicating an exemplary sheet width of 48,000 inches.

The apertures 118 and 120 respectively are designated "parts lenght" and "parts width." The dimensions of the exemplary part to be cut are 39.625 inches by 28.750 inches.

Assuming that the starting stock has an original size of 120 inches by 48 inches, it will be recalled that the primary sizing operation calls for the arranging of as many of a part as possible on the starting sheet. It will be observed that three pieces of the exemplary part noted above can be cut from the starting sheet of this size, and a three-digit display for indicating the number of parts to be produced from a given sheet are visible behind the aperture 122. Similarly, a two-digit display is visible behind the aperture 124 which may serve to indicate the position of the scrap return chute.

The apertures 126 and 128 are designated respectively "gauge length" and "gauge width." Five-digit displays are visible behind both of the apertures, each of which is designed to register the back gauge setting of the machine. These displays are arranged through conventional wiring and control so that only one of them will be visible for any given cut, so that the operator, by determining which display is visible, is able to immediately determine the orientation of stock feed.

For example, according to the method of this invention a sheet of stock is first sheared by length. Using the figures set out above, three pieces, each having a width of 28,750 inches are to be cut from a sheet having a starting width of 48,000 inches, making a cutoff of 19.250 inches. For this initial cut, only the display behind the gauge length aperture 126 will be visible, so that the operator knows that the sheet must be fed with its long edge parallel to the knife.

Still using the exemplary figures above, the sheet must be sheared by width. Three pieces, each having a length of 39.625 inches are to be cut from a starting sheet having a length of 120.000 inches. The total length of the parts blank will therefore be 118.875 inches, and the cutoff must be 1.125 inches. The orientation of feed is indicated to the operator by the fact that the gauge width display 128 is visible, while the gauge length display 126 will not be visible.

The parts blank created by the foregoing primary sizing operation is then sheared by length into a number of parts rows, and the rows are sheared by width into the individual parts. It is of course possible to use the gauge length display 126 and the gauge width display 128 noted above in order to indicate the orientation of stock feed for these cuts, but in some cases, a further refinement may be desirable. That is, it is also contemplated by this invention that when the gauge setting for a given cut corresponds to either part length or part width, only the appropriate display in aperture 118 or 120 respectively will be visible. In other words, during the primary and secondary sizing operations wherein gauge settings are more than one multiple of part length or part width, the gauge length display 126 or gauge width display 128 will indicate the orientation of stock feed to the operator. On the other hand, when the gauge setting corresponds to either part length or part width, only corresponding part length display 118 or part width display 120 will be visible, thereby indicating the orientation of feed for these cuts.

It will be recalled that the primary sizing operation yields at least one cutoff, and referring back to the earlier example, may produce as many as three cutoffs, upon which the secondary sizing operation is carried out. At the completion of the primary sizing operation, and the production of individual parts from the parts blank, the displays behind apertures 114 and 116 will change, indicating a new sheet length and sheet width corresponding to one of the cutoffs produced in the primary sizing operation. This will give a clear indication to an operator of which of the various returned cutoffs is to be utilized for the secondary sizing operation. The operation of the remainder of the displays will correspond to the exemplary operation described above.

The aperture 130 in FIG. 3 is designated "front gauge." Visible behind this aperture is a six-digit display indicating the position of the front gauge. As explained earlier, the front gauge is utilized to determine length of cutoff beyond the range of the back gauge settings.

It will of course be understood that the control panel may be provided with various other indicators to display such additional information as may be desirable for the operator.

It is believed that the foregoing constitutes a full and complete disclosure of this invention. Numerous modifications may be made without departing from the scope and spirit thereof. For example, the process can be employed where several different sized sheets of material are available for each primary sizing operation. Similarly, it will be apparent that automatic stock feeding equipment can be employed with such a system to achieve further labor economies. While the invention has been described in terms of an exemplary embodiment, no limitations are intended except as specifically set forth in the claims which follow.

We claim:

1. A method of shearing from stock a plurality of different sized parts in an array of parts according to magnitude of area comprising the steps of:
   a. shearing said sheet by length and width to produce a part blank of a length and width equal to at least one multiple of the length and width of substantially the largest part in said array of parts and producing a length cutoff and a width cutoff;
   b. shearing said part blank to produce at least one multiple of said substantially largest part;
   c. selecting by a computer means from the smaller parts in the array of parts, the part which can be sheared from the length cutoff with substantially least scrap and shearing the length cutoff to produce at least one multiple of the selected part;
   d. selecting by computer means from the smaller parts in the array of parts, the part which can be sheared from the width cutoff with substantially the least scrap and shearing at least one multiple of the selected part.

2. The method of claim 1 including the additional step of selecting a second sheet of stock, shearing as many as possible of the said substantially largest of said parts to be cut, said shearing step producing a length cutoff and a width cutoff, selecting by computer means from the smaller of the parts to be cut the part which can be sheared from the length cutoff with substantially the least scrap and shearing the length cutoff to produce at least one multiple of the selected part, and selecting by computer means from the smaller of said parts to be cut, the part which can be sheared from the width cutoff with substantially the least scrap and shearing the width cutoff to produce at least one multiple of the selected part.

3. A method of shearing an elongated sheet of stock to produce a plurality of different sized parts comprising the steps of:
   a. shearing said sheet lengthwise to produce a portion with a width equal to at least one multiple of a part width, and a first cutoff;
   b. then shearing said portion by width to produce a part blank with a length equal to at least one multiple of said part length and a second cutoff;
   c. shearing said part blank by length and then by width to produce said part;
   d. thereafter shearing said first cutoff by length and then by width to produce a second part blank for a second part; and 4. A method of shearing an elongated sheet of stock to produce a plurality of different sized parts comprising the steps of:
   a. shearing said sheet lengthwise to produce a portion with a width equal to at least one multiple of a part width, and a first cutoff;
   b. then shearing said portion by width to produce a part blank with a length equal to at least one multiple of said part length and a second cutoff;
   c. shearing said part blank by length and then by width to produce said part;
   d. thereafter shearing said first cutoff by length and then by width to produce a second part blank for a second part;
   e. shearing said second part blank by length and then by width to produce said second part; and
   f. shearing said second cutoff by length and then by width to produce a third part blank for a third part.

5. A method of shearing a plurality of different sized parts from sheet stock comprising the steps of;
   a. selecting the substantially largest part to be cut and shearing said sheet stock by length and then by width to produce a parts blank having a length and a width equal respectively to at least one multiple of said part length and width, and a first and second cutoff;
   b. selecting a substantially smaller part to be cut which can be sheared from said first cutoff with substantially the optimum utilization of said first cutoff and the least scrap;
   c. shearing said first cutoff by length and then by width to produce a second parts blank having a length and a width equal respectively to at least one multiple of said smaller part length and width; and
   d. providing visual display means for indicating to an operator the orientation of stock feed for each said shearing cut including the provision of two indicators each adapted to display sheared dimensions, and displaying only one of said indicators.

6. The method claimed in claim 5 including the step of shearing said first mentioned parts blank by length and then by width to produce at least one of said largest part to be cut prior to said step of selecting the smaller part to be cut.

7. The method claimed in claim 5 including the step of shearing said second parts blank by length and then by width to produce at least one of a smaller part to be cut.

8. In a manufacturing process wherein a plurality of different sized parts each having a specified quantity requirement are sheared from stock, the improved method of minimizing scrap comprising the steps of:
   a. arranging said parts to be cut into substantially consecutive order as to area;
   b. selecting a first sheet of said stock;
   c. shearing a parts blank of a size to include at least two of the substantially largest of said parts to be cut from said first sheet of stock, said shearing step producing at least a first cutoff;
   d. selecting the smaller uncut part which in any portion of quantity required can be cut from said first cutoff with the least unused stock; and
   e. shearing as many of said smaller parts as possible from said first cutoff.

PO-1050
(5/69)

UNITED STATES PATENT OFFICE
CERTIFICATE OF CORRECTION

Patent No. 3,598,007          Dated August 10, 1971

Inventor(s) Ronald S. Williams and John J. Erhart

It is certified that error appears in the above-identified patent and that said Letters Patent are hereby corrected as shown below:

Column 7, after line 56, please insert -- (e) shearing said second cutoff by length and then by width to produce a third part blank for a third part. --

Signed and sealed this 25th day of April 1972.

(SEAL)
Attest:

EDWARD M. FLETCHER, JR.
Attesting Officer

ROBERT GOTTSCHALK
Commissioner of Patents